(12) United States Patent
Teniou et al.

(10) Patent No.: US 8,799,940 B2
(45) Date of Patent: Aug. 5, 2014

(54) METHOD OF CODING A SCALABLE VIDEO STREAM DESTINED FOR USERS WITH DIFFERENT PROFILES

(75) Inventors: Gilles Teniou, Rennes (FR); Christophe Daguet, Goven (FR); Ludovic Noblet, Betton (FR)

(73) Assignee: France Telecom, Paris (FR)

( * ) Notice: Subject to any disclaimer, the term of this patent is extended or adjusted under 35 U.S.C. 154(b) by 527 days.

(21) Appl. No.: 12/745,624

(22) PCT Filed: Dec. 1, 2008

(86) PCT No.: PCT/FR2008/052171
§ 371 (c)(1),
(2), (4) Date: Sep. 3, 2010

(87) PCT Pub. No.: WO2009/080926
PCT Pub. Date: Jul. 2, 2009

(65) Prior Publication Data
US 2011/0004912 A1    Jan. 6, 2011

(30) Foreign Application Priority Data
Nov. 30, 2007 (FR) .................................. 07 59452

(51) Int. Cl.
*H04N 7/16* (2011.01)
(52) U.S. Cl.
USPC ........................ 725/25; 375/240.01; 348/43
(58) Field of Classification Search
USPC ....................................................... 725/25
See application file for complete search history.

(56) References Cited

U.S. PATENT DOCUMENTS

| | | | |
|---|---|---|---|
| 6,904,610 B1* | 6/2005 | Bayrakeri et al. | 725/54 |
| 7,568,210 B2* | 7/2009 | Asmussen | 725/34 |
| 2003/0030652 A1* | 2/2003 | Billmaier et al. | 345/629 |
| 2005/0166245 A1* | 7/2005 | Shin et al. | 725/104 |
| 2006/0244840 A1* | 11/2006 | Eshet et al. | 348/222.1 |
| 2007/0035665 A1 | 2/2007 | Khare et al. | |
| 2007/0277197 A1* | 11/2007 | Dawson | 725/37 |

FOREIGN PATENT DOCUMENTS

| | | |
|---|---|---|
| EP | 1713280 A2 | 10/2006 |
| WO | 0178395 A1 | 10/2001 |
| WO | 03052697 A2 | 6/2003 |
| WO | 03071806 A1 | 8/2003 |
| WO | 2007064082 A1 | 6/2007 |
| WO | 2007112384 A2 | 10/2007 |

OTHER PUBLICATIONS

International Search Report and Written Opinion dated Feb. 5, 2010 for corresponding International Application No. PCT/FR2008/052171, filed Dec. 1, 2008.

(Continued)

*Primary Examiner* — Robert Hance
(74) *Attorney, Agent, or Firm* — David D. Brush; Westman, Champlin & Koehler, P.A.

(57) ABSTRACT

A method is provided of coding a video sequence as a video stream having a base layer and one or more refinement layers destined for users having different user profiles. A visual object is coded in at least one of the refinement layers codes, which is distinct from visual objects coded in the base layer or in another of the refinement layers. The visual object corresponds to semantic content destined specifically for the users of one of the profiles.

7 Claims, 6 Drawing Sheets

(56) References Cited

OTHER PUBLICATIONS

Haskell et al., "Digital Video: An Introduction to MPEG-2" 1996, Chapman & Hall, USA, XP002485775, p. 344-350.

Chih-Hung Li et al., "A Low Complexity Picture-in-Picture Transcoder for Video-on-Demand" Wireless Networks, Communications and Mobile Computing, 2005 Internati Onal Conference on Maui, HI, USA Jun. 13-16, 2005, Piscataway, NJ, USA, IEEE, vol. 2, Jun. 13, 2005, pp. 1382-1387, XP010888163.

Phivos Mylonas et al., "Towards an Integrated Personalized Interactive Video Environment" Multimedia Software Engineering, 2004, Proceedings, IEEE Sixth International Symposium on Miami, FL, USA Dec. 13-15, 2004, Pascataway, NJ, USA, IEEE, Dec. 13, 2004, pp. 124-131, XP010757238.

Per Frojdh et al., "Combined Scalable Media in File Format" Video Standards and Drafts, XX, XX, No. M12835, Jan. 12, 2006, XP030041504.

Y. Wang et al., "Video Processing and Communications" 2002, Prentice Hall, USA, XP002485757, pp. 359-361.

English Translation of the Written Opinion of the International Searching Authority dated Feb. 5, 2010 for corresponding International Application No. PCT/FR2008/052171, filed Dec. 1, 2008.

"MPEG-4 Part 10 AVC (H.264) Video Encoding", Scientific-Atlanta, Inc., Jun. 2005, 24 pages.

* cited by examiner

METHOD OF CODING A SCALABLE VIDEO STREAM DESTINED FOR USERS WITH DIFFERENT PROFILES

CROSS-REFERENCE TO RELATED APPLICATIONS

This Application is a Section 371 National Stage Application of International Application No. PCT/FR2008/052171, filed Dec. 1, 2008 and published as WO 2009/080926 on Jul. 2, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates generally to the field of coding and decoding images or video image sequences. To be more precise, the disclosure relates to techniques for coding and decoding images in a video stream organized as layers of data enabling generation of a video stream that is scalable temporally, in quality, and in spatial resolution.

BACKGROUND OF THE DISCLOSURE

These techniques compress the video stream to be coded in accordance with a predictive and hierarchic layered scheme: the video stream is divided into a base layer and one or more refinement layers, each nested within a layer of higher level. Each layer combined with information contained in the layer of the higher level makes it possible to improve the image frequency of the decoded stream, its spatial resolution and/or its quality. One such technique is the Scalable Video Coding (SVC) technique currently in the process of standardization by the Joint Video Team (JVT), an alliance between the MPEG (Moving Picture Expert Group) standardization group (IS O/IEC JTC1/SC29/WG11) and the International Telecommunications Union (ITU-T SG16 Q.6), in the form of an extension of the International Standards Organization (ISO) standard 14496-10, also known as the H.264/MPEG-4 AVC (Advanced Video Coding) standard.

FIG. 1 shows an example of a data stream compressed in accordance with this standard. It consists of a base layer CB and two refinement layers CR1 and CR2 associated with the base layer CB. The refinement layers CR1 and CR2 code data making it possible to enhance the quality, spatial resolution or frequency of the coded images in the base layer CB, which is a stream coded to the ABC standard, for example. The SVC standard also provides for segmenting these layers CB, CR1, and CR2 into temporal levels NT1, NT2, and NT3.

Such techniques make it possible for terminals with different capabilities, such as fixed personal computers, mobile telephones, and personal digital assistants (PDA), to receive the same content broadcast over a communications network such as the Internet and to decode it as a function of their respective capabilities. Thus a low-resolution mobile terminal decodes only the base layer of content received via the transmission network, whereas fixed terminals of greater capability decode the base and refinement layers of the content, thereby displaying the content with maximum quality. These scalable coding techniques therefore make it possible to save on bandwidth, a single content being broadcast to terminals with different capabilities instead of one content being broadcast for each type of terminal.

Moreover, some contents also require adaptation as a function of the profile of the user receiving them. For example, a content provider seeking to promote a video program often broadcasts the entire program to subscribers to the program and broadcasts only a portion of the program to non-subscribers or broadcasts it to them in encrypted form. Similarly, some programs are adapted to suit persons with a hearing impairment: an interpretation in sign language is embedded in the broadcast images for them. Other programs further require regional differentiation; for example, the news carries different stories as a function of the regions in which it is broadcast.

Scalable image coding techniques as described above provide no specific processing for personalizing the same video stream. Accordingly, to personalize a video stream as a function of different profiles, a content server broadcasting the video stream in a communications network must at the head end code and broadcast as many scalable video streams, for example as many SVC streams, as there are user profiles. This therefore requires as many multimedia session negotiations between the content server and one of the points of presence redistributing this stream to the users in the communications network as there are user profiles, and likewise as many assignments of resources between these two network entities as there are user profiles. This implementation is not the optimum, because the multimedia sessions negotiated in this way and that have to be maintained are costly to create and to maintain even though they have substantially identical characteristics:

start and end of multimedia session;
necessary bit rate;
coding of base and refinement layers;
distribution core network, etc.

SUMMARY

An aspect of the present disclosure relates to a method of coding a video sequence in a video stream including a base layer and one or more refinement layers for users having different user profiles, the method being characterized in that at least one of said refinement layers codes a visual object distinct from the visual objects coded by said base layer or by another of said refinement layers, said visual object corresponding to a semantic content specifically for users with one of said profiles.

In an example, the refinement layers of the same scalable video stream are used to code different contents as a function of different user profiles, the base layer coding a portion of the content of the video stream that is generic to all these user profiles. This division of the content of the video stream into a generic portion and a personalized portion makes it possible to save on bandwidth when transmitting the stream over a communications network. Note that coding this generic portion is not necessarily limited to the base layer, refinement layers being dedicated to improving the quality, spatial resolution or frequency of only this generic portion, for example.

An embodiment of the invention also provides a method of transmitting a video stream to users having different user profiles, said users being connected via display terminals to a communications network, and said video streams being coded using the coding method of an embodiment of the invention, said transmission method including the steps of:

determining as a function of the profile of one of said users said at least one refinement layer for coding a visual object distinct from the visual objects coded by said base layer or by another of said refinement layers; and sending said base layer and said refinement layer determined in this way to said user via said communications network, said refinement layer being intended to be combined with said base layer.

Accordingly, if this video stream is compressed to the SVC standard, for example, it is necessary to transmit only one SVC stream between a content server and an associated point of presence in the communications network in order to send all the personalized versions of the video stream to that point of presence. The base layer being common to all the user profiles, it suffices at the point of presence, for each different user profile, to associate this base layer with the refinement layer or layers corresponding to each user profile to create a plurality of video streams each adapted to a particular user profile.

Moreover, an embodiment of the invention makes it possible to simplify the transmission of the personalized video stream between the content server and the point of presence, as this requires only one multimedia session negotiation.

In one noteworthy implementation of the transmission method of an embodiment of the invention:

said base layer sent to said user codes a sequence of initial images from which areas of interest have been extracted; and said refinement layer sent to said user codes said areas of interest.

This implementation of the method for transmitting a video stream makes it possible to promote a video program by showing non-subscriber users only portions of the images broadcast to subscriber users. For example, subscribers to the video program see complete images of a football match whereas non-subscribers see only images of the empty pitch without players or ball. For example, if the images of the video stream are modeled by deformable meshing and compressed by a wavelet-based technique, the refinement layers intended for subscriber users then code the meshes associated with the players and the ball. Note that this type of coding is not usable in an SVC stream as standardized at present, but is to be provided in future types of scalable stream.

This video program promotion method is less costly in bandwidth than the usual methods that consist in broadcasting two versions of the program, a complete version for subscribers and an incomplete version for non-subscribers. It is also less complex than methods using encryption techniques, in which an encrypted video stream is broadcast, only subscribers to the corresponding video program having the key for descrambling the stream. The fact of not requiring any decryption key also makes piracy more difficult.

An embodiment of the invention further provides a method embedding images of a first video stream in images of a second video stream, characterized in that it uses a third video stream coded using the coding method of an embodiment of the invention, and wherein:

said base layer codes images obtained by processing said images of the second video stream, said processing including a step of extracting image portions situated in embedding areas intended to receive said images of the first video stream; and said at least one refinement layer codes said images of the first video stream.

This image embedding method of an embodiment of the invention makes it possible to insert a first video into a small window inside a full-screen second video, for example video of a sign-language interpreter into video of a TV magazine. This produces a personalized video, as the first video may vary as a function of the user receiving the second video.

Compared to the usual methods of inserting one video into another, known as Picture-in-Picture (PiP) methods, the embedding method of an embodiment of the invention makes it possible to simplify the decoding of a personalized video stream obtained by such video insertion and to reduce the bit rate of the stream arriving at the decoder that effects the decoding. The usual PiP methods require the decoder to manage two different video streams and thus two instances of decoding and to implement software making it possible to superpose the two video streams, which is complex. Moreover, with such methods, the video stream that is in windowed mode has a bit rate that is added to that of the video stream displayed full screen. The embedding method of an embodiment of the invention simplifies decoding by sending the decoder only one scalable video stream, for example an SVC stream, consisting of a base layer coding the images of the full-screen video stream from which has been subtracted the window for embedding images of the video stream in windowed mode and a refinement layer coding the images of the video stream in windowed mode. The full-screen video stream not being sent to the user in its entirety, the bit rate received at the decoder is therefore lower than in PiP methods. Moreover, by means of an embodiment of the invention, the videos are superposed automatically in the decoder as a function of the refinement layers that it receives, which refinement layers may code different videos as a function of the user profile.

An embodiment of the invention further provides a method of differentiating an audiovisual program broadcasting successively a generic sequence of images and then personalized sequences of images using the method of an embodiment of the invention of transmitting a video stream, wherein:

when said generic sequence is broadcast, said base layer codes said generic sequence; and when said personalized sequences are broadcast, said at least one refinement layer codes only one of said personalized sequences, said base layer no longer coding visual objects, and said personalized sequence being intended for said users.

This differentiation method of an embodiment of the invention makes it possible to differentiate audiovisual programs at a point of presence in a broadcast network, for example regional differentiation of TV news, without using at the point of presence dedicated software commonly referred to as a splicer. A splicer is usually employed to join a plurality of video streams, for example the end of a video stream corresponding to national TV news and the beginning of a video stream corresponding to regional TV news. By means of an embodiment of the invention, this splicing is not necessary: for example, an SVC video stream is sent to the decoder of a user in which the base layer codes the national TV news while that is being broadcast and nothing when the regional TV news is broadcast, and conversely the refinement layers code only the regional TV news while that is being is broadcast. The streams are therefore spliced naturally in the decoder by combining refinement layers with the base layer.

An embodiment of the invention further provides a device for coding a video stream including a base layer and one or more refinement layers, the device being characterized in that it includes means adapted to implement the coding method of an embodiment of the invention.

An embodiment of the invention further provides a system for transmitting a video stream including a base layer and one or more refinement layers to users having different user profiles, said users being connected via display terminals to a communications network, and said system including means for transmitting said base layer to said users via said communications network, the system being characterized in that it further includes:

means for determining as a function of the profile of one of said users at least one layer of said refinement layers coding a visual object distinct from the visual objects coded by said base layer or by another of said refinement layers, said visual object corresponding to a semantic content specifically for users with one of said profiles; and means for transmitting said refinement layer determined in this way to said user via said communications network, said refinement layer being intended to be combined with said base layer.

This transmission system of an embodiment of the invention is limited to a single device, for example, like a point of presence in the communications network, or to the contrary is formed of a plurality of servers connected to user profile databases, for example.

An embodiment of the invention further provides a signal representing data of video stream for users having different user profiles, said users being connected via display terminals to a communications network, and said data being coded by a base layer and one or more refinement layers, said signal being characterized in that at least one of said refinement layers codes a visual object distinct from the visual objects coded by said base layer or by another of said refinement layers, said visual object corresponding to a semantic content specifically for users with one of said profiles.

The coding device of an embodiment of the invention, the transmission system of an embodiment of the invention, and the signal of an embodiment of the invention representing data of a video stream have advantages analogous to those of the coding method of an embodiment of the invention and the method of transmitting a video stream of an embodiment of the invention.

An embodiment of the invention finally provides a computer program including instructions for implementing one of the methods of the invention when it is executed on a computer.

BRIEF DESCRIPTION OF THE DRAWINGS

Other features and advantages become apparent on reading the description of a preferred implementation given with reference to the figures, in which.

DETAILED DESCRIPTION OF ILLUSTRATIVE EMBODIMENTS

Figure 2:
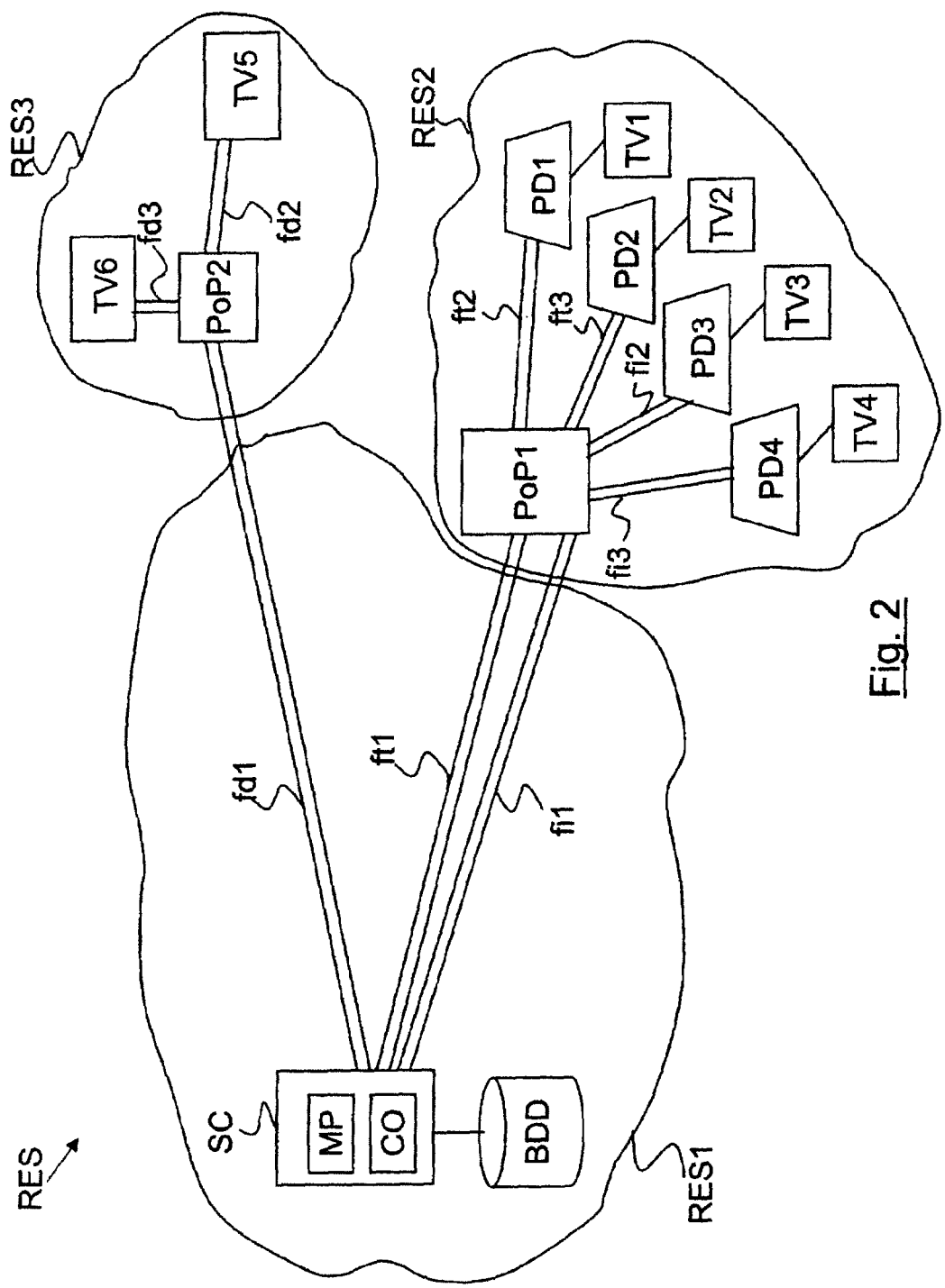
FIG. 2 represents a transmission system using the coding method of an embodiment of the invention, the transmission method of an embodiment of the invention, the image embedding method of an embodiment of the invention and the audiovisual program differentiation method of an embodiment of the invention in a communications network.

A preferred implementation of an embodiment of the invention is implemented in a communications network RES represented in FIG. 2 to which users with different profiles are connected via display terminals, notably the terminals TV1, TV2, TV3, TV4, TV5, and TV6. The communications network RES consists of networks of a plurality of types, a core network RES1, for example the Internet, an access network RES2, for example the public switched telephone network (PSTN), an access network RES3, for example a optical fiber digital television distribution cable network, a Wi-Fi (Wireless Fidelity) network (Institute of Electrical and Electronics Engineers (IEEE) standard 802.11) or a 3G access network using the Universal Mobile Telecommunications System (UMTS) technology. The display terminals TV1, TV2, TV3, and TV4 in the access network RES2 are connected to respective home gateways PD1, PD2, PD3, and PD4 that are connected to a service point of presence PoP1 in the access network RES2, for example using the ADSL (Asymmetrical Digital Subscriber Line) technology. The terminals TV5 and TV6 are also connected to a service point of presence PoP2 in the access network RES3, for example via optical fiber. These points of presence PoP1 and PoP2 are connected by optical fiber to a content server SC in the communications network RES1. Other types of network architecture making it possible to transmit video streams may of course be used to implement an embodiment of the invention.

In this implementation, the coding method of an embodiment of the invention is implemented in software in the content server SC managing the broadcasting of video sequences stored in a database BDD connected to the content server SC. The database BDD also contains a table for programming broadcasting of these video sequences to users connected to the communications network RES. For each of these users there is a corresponding user profile making it possible to broadcast certain contents only to users having a certain profile. The database BDD therefore also contains a table of correspondences between the video sequences in the database BDD and the user profiles, making it possible to determine the users to whom each video sequence must be transmitted.

The content server SC further includes two software modules, namely a preprocessing module MP for preprocessing certain contents and a coding module CO for coding contents into a scalable stream, and the operation of both of them is described in detail below.

In this implementation, the content server SC preprocesses contents and codes them in accordance with an embodiment of the invention in order to deliver scalable video streams fd1, ft1, and fi1 that can be personalized by the points of presence PoP1 and PoP2 in the respective access networks RES2 and RES3. The transmission method of an embodiment of the invention is implemented in the points of presence PoP1 and PoP2, which use the streams fi1, fd1, and ft1 coded in accordance with an embodiment of the invention to transmit personalized streams, for example. The method of an embodiment of the invention of differentiating an audiovisual program is implemented in the point of presence PoP2, which uses the stream fd1 to effect this differentiation, for example. Similarly, in this implementation the embedding method is implemented in the display terminal TV4, which uses the stream fi3 coded in accordance with an embodiment of the invention.

Other implementations may be envisaged; for example in one variant the point of presence PoP1 receives from the content server SC coded video sequences in a non-scalable stream, codes these sequences in accordance with an embodiment of the invention into a scalable stream, and delivers said stream to the home gateways PD1 to PD4, which then implement the transmission method an embodiment of of the invention.

Figure 1:
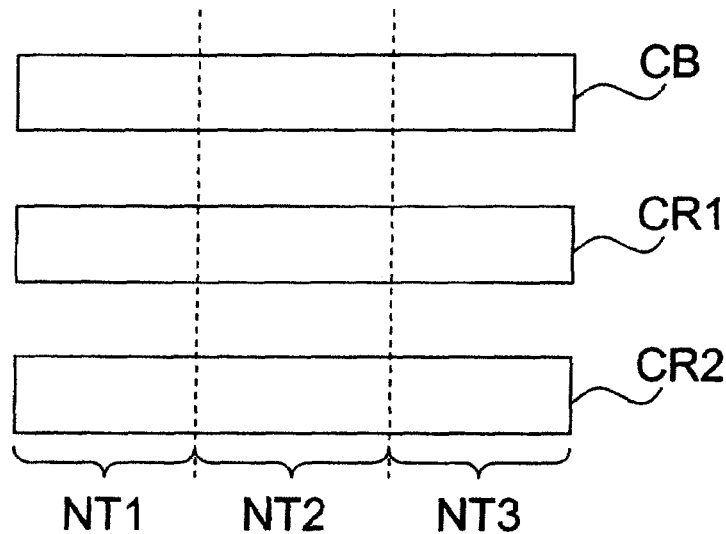
FIG. 1, already commented on in relation to the prior art, represents an SVC video stream.
Figure 3:
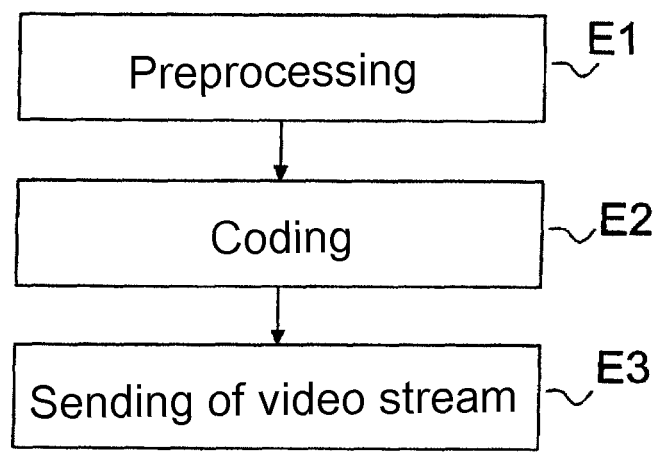
FIG. 3 represents steps of the coding method of one implementation of the invention.

The video streams fd1, ft1, and fi1 based on video sequences contained in the database BDD are transmitted to the points of presence PoP1 and PoP2 in three steps E1 to E3 represented in FIG. 3

The first step E1, executed by the software module MP, is a step of preprocessing video sequences contained in the database BDD and intended to be broadcast to users connected to the communications network RES. For example:

By consulting the programming table and the correspondence table contained in the database BDD, the content server SC determines that it must broadcast a football match in its entirety to subscriber users and the same football match with areas of interest removed to non-subscriber users. Here these areas of interest are determined as being the players and the ball present in each image of the initial video sequence of the football match. Thus in this step El the content server SC preprocesses the images of the video sequence of this football match contained in the database BDD in such a manner as to generate two data streams:
  a first stream coding the images of the sequence but without coding any players or the ball;
  a second stream coding the players and the ball present in each image of the sequence.

These streams are generated using masks consisting of blocks of pixels, for example, making it possible to determine the areas of the image containing players or the ball. The pitch in the images of the first stream containing neither players or ball is recomposed by image processing at the places where the players and the ball have been extracted, for example using interpolation techniques.

Alternatively, the stream coding the players and the ball present in each image of the sequence is scrambled by the software module MP, i.e. the images of the players and the ball are scrambled. In a different implementation, the first stream codes images from the video sequence of the football match to be broadcast in which the players and the ball are coded in a degraded or concealed form.

Figure 4:
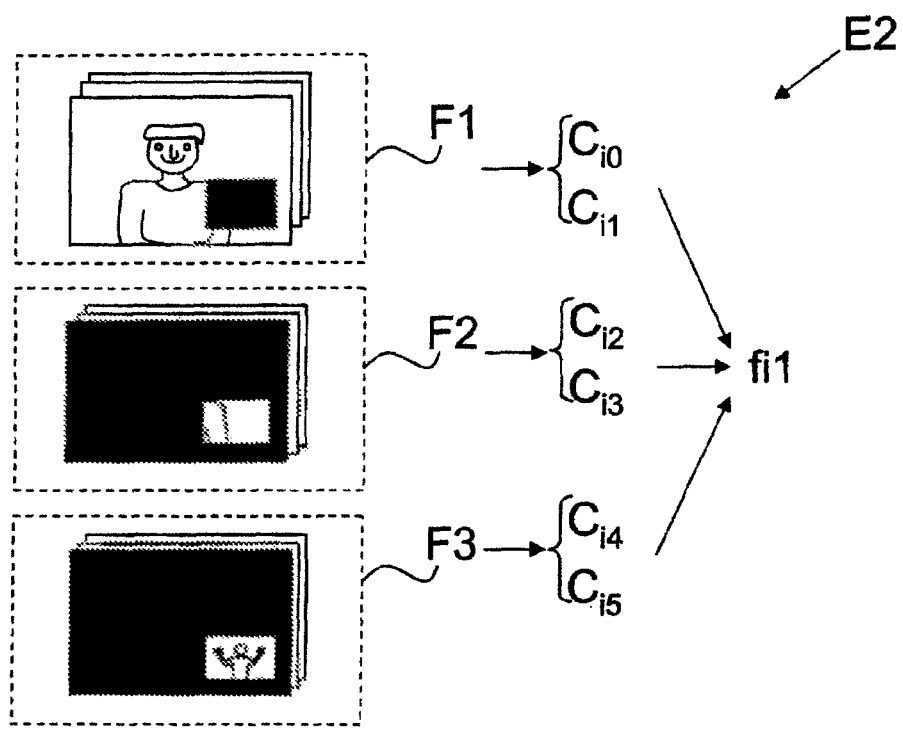
FIG. 4 represents images coded by different layers of an SVC-type video stream coded in accordance with an embodiment of the invention.

Similarly, the content server SC determines that it must broadcast a news magazine to users connected to the communications network RES and that it must also broadcast this news magazine with a small embedding window showing the video of a sign language interpreter for other users who suffer from a hearing impairment. Thus in this step E1 the content server SC preprocesses the images of the video sequence of the news magazine contained in the database BDD in such a manner as to generate three data streams represented in FIG. 4:
  A stream F1 coding the news magazine images from which are extracted the pixels of a square corresponding to the small embedding window. The corresponding square is therefore coded in black in this stream F1 or in a compression mode making it possible to consume as little bit rate as possible. The inter-images of the square are coded in SKIP mode, for example.
  A stream F2 coding images complementing those coded by the stream F1, i.e. images consisting of black pixels with the exception of pixels corresponding to the small embedding square, of values that are those of the pixels extracted from the news magazine images. The stream F2 therefore codes news magazine image portions corresponding to the small embedding window.
  A stream F3 coding images consisting of black pixels with the exception of pixels corresponding to the small embedding window, these reproducing on a small scale the images of the video showing a sign language interpreter. For example, to generate these streams the software module MP uses a mask making it possible to determine the area corresponding to the small embedding window in the large format images, i.e. the same size as the news magazine images.

Note moreover that numerous variants of the embedding method are possible; for example the streams F1, F2, and F3 are instead coded in such a manner as to embed in the news magazine images a plurality of small videos with different sizes or formats and at different places.

The second step E2, executed by the software module CO, is a step of coding video sequences preprocessed in the step E1 and other video sequences that do not require preprocessing but must also be broadcast to users connected to the communications network RES. In this implementation, the software module CO codes these sequences using SVC scalable streams. Other types of scalable stream coding are also usable, however.

This coding in accordance an embodiment of with the invention has the particular feature, compared to the SVC standard, of coding different contents in different layers of the same scalable stream. The base layer codes a content generic to all the user profiles whereas contents more specific to one or more users are coded in refinement layers. These specific contents correspond to different visual objects, i.e. form a semantic content that is added to or substituted for that coded by the base layer or by other refinement layers. In other words, these specific contents do not merely contribute to refining the quality, the spatial resolution or the frequency of the images coded by the base layer or by another refinement layer, as with the SVC standard.

Figure 5:
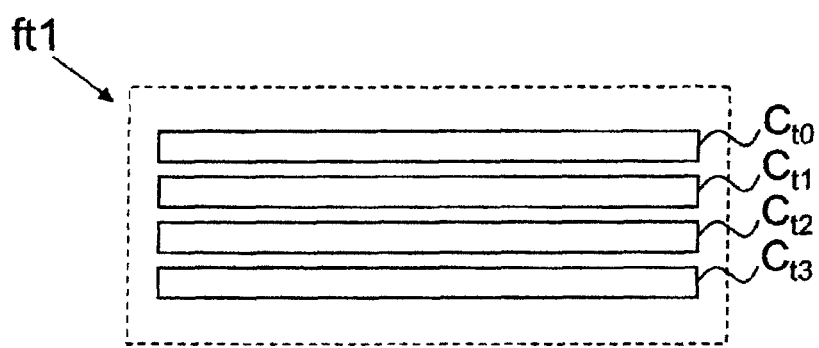
FIG. 5 represents an SVC-type video stream coded in accordance with the an embodiment of and employed in one use of the transmission method of an embodiment of the invention.

For example, in this step E2, the software module CO produces a plurality of SVC streams:
  The stream ft1 corresponding to the football match to be broadcast by the content server SC. This stream, represented in FIG. 5, comprises:

a base layer $C_{r0}$ for coding in low resolution the images preprocessed in the step E1 and corresponding to a sequence of images of the empty pitch;

a refinement layer $C_{r1}$ for refining the resolution of the images coded by the base layer $C_{r0}$.

a refinement layer $C_{r2}$ for coding in low resolution the images of the players and the ball that are produced by the preprocessing in the step E1; and a refinement layer $C_{r3}$ for refining the resolution of the images coded by the refinement layer $C_{r2}$.

Figure 6:
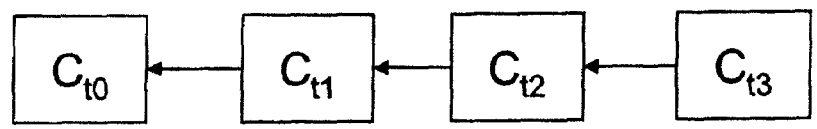
FIG. 6 represents a nesting of refinement layers within a base layer of an SVC stream in a first variant of one implementation of an embodiment of the invention.

Each refinement layer indicates in its syntax which layer is used for interlayer prediction. The refinement layers are thus nested one within the other in the base layer as a tree, as shown in FIG. 6: the layer $C_{13}$ uses the layer $C_{r2}$, which uses the layer $C_{r1}$, which itself uses the layer $C_{r0}$.

Figure 7:
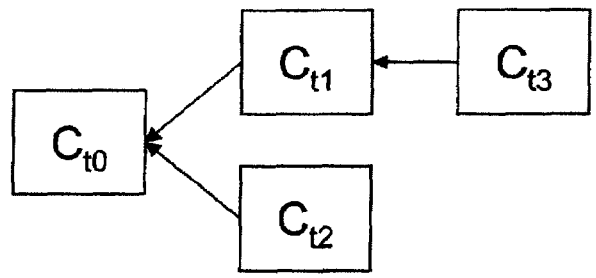
FIG. 7 represents a nesting of refinement layers within a base layer of an SVC stream in a second variant of one implementation of an embodiment of the invention.

Alternatively, the refinement layers are nested one within the other in the base layer as a tree, as shown in FIG. 7: the layer $C_{r3}$ uses the layer $C_{r1}$, which uses the layer $C_{r0}$, whereas the layer $C_{r2}$ uses the layer $C_{r0}$. In this implementation, the refinement layer $C_{r3}$ codes entirely and in high resolution the images of the players and the ball obtained by preprocessing in the step E1. This variant enables a subscriber user having a high-definition television to decode only three layers $C_{r0}$, $C_{r1}$, and $C_{r3}$ and a subscriber user having a television of standard-definition to decode only two layers, instead of, respectively, four layers ($C_{r0}$, $C_{r1}$, $C_{r3}$, and $C_{r4}$) and three layers ($C_{10}$, $C_{r1}$, and $C_{r2}$) if the nesting corresponding to FIG. 6 is used. It further makes it possible for a subscriber user having a standard-definition television to receive a stream conforming better to the capabilities of their television.

Moreover, the players, the ball, and the empty pitch are coded in blocks that are not in corresponding relationship with those of the base layer. This feature makes it possible for a decoder that receives the stream ft1 not to user interlayer prediction when combining the layers $C_{r2}$ and $C_{r1}$, for example. In contrast, interlayer prediction is used by the decoder for layers having a real refinement function, for example between the layers $C_{r1}$ and $C_{r0}$ or $C_{r3}$ and $C_{r2}$.

Figure 8:
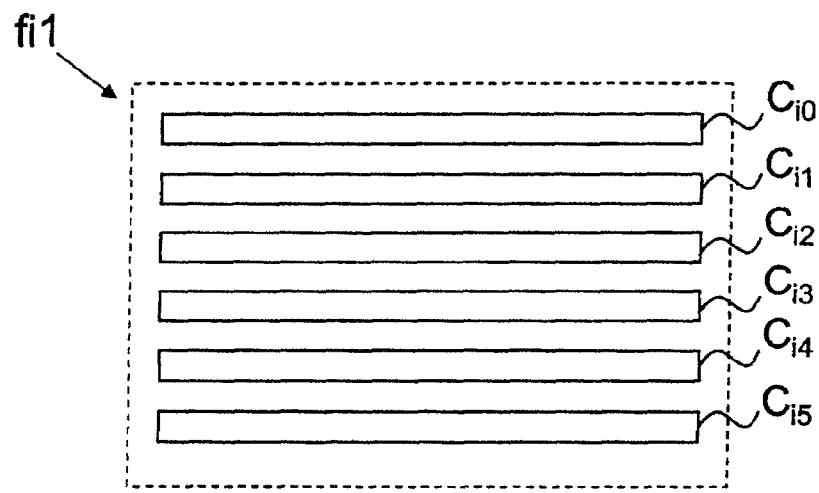
FIG. 8 represents an SVC video stream coded in accordance with an embodiment of the invention and employed in one use of the image embedding method of an embodiment of the invention.

The software module CO also produces the stream fi1 corresponding to the news magazine to be broadcast by the content server SC. This stream, represented in FIG. 8, comprises:

a base layer $C_{r0}$ for coding in low resolution the images of the stream F1;

a refinement layer $C_{i1}$ for refining the resolution of the images coded by the base layer $C_{i0}$;

a refinement layer $C_{i2}$ for coding in low resolution the images of the stream F2;

a refinement layer $C_{i3}$ for refining the resolution of the images coded by the refinement layer $C_{i2}$;

a refinement layer $C_{i4}$ for coding in low resolution the images of the stream F3; and a refinement layer $C_{i5}$ for refining the resolution of the images coded by the refinement layer $C_{i4}$.

Figure 9:
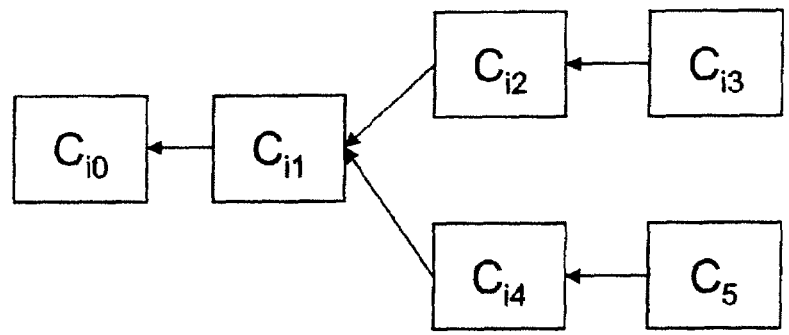
FIG. 9 represents a nesting of refinement layers within a base layer of an SVC stream in a first variant of one implementation of an embodiment of the invention.

As for the stream ft1, each refinement layer of the stream fi1 indicates in its syntax which layer it uses for interlayer prediction. The refinement layers are thus nested one within the other in the base layer as a tree, as shown in FIG. 9: the layer $C_{i3}$ uses the layer $C_{i2}$, which uses the layer $C_{i1}$, which itself uses the layer $C_{i0}$, and the layer $C_{i5}$ uses the layer $C_{i4}$, which uses the layer $C_{i1}$, which itself uses the layer $C_{i0}$. In reality, as the blocks of the layer $C_{i2}$ do not correspond to those of the layer $C_{i1}$ and the blocks of the layer $C_{i4}$ do not correspond to those of the layer $C_{i1}$, a decoder receiving the stream fi1 does not use interlayer prediction when combining $C_{i2}$ and $C_{i1}$ or $C_{i4}$ and $C_{i1}$.

Figure 10:
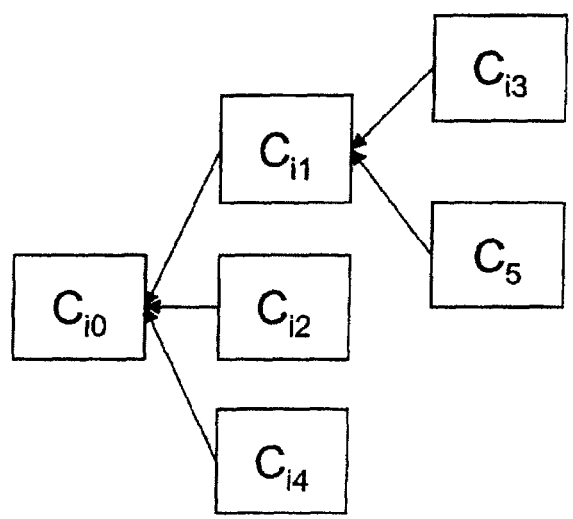
FIG. 10 represents a nesting of refinement layers within a base layer of an SVC stream in a second variant of one implementation of an embodiment of the invention.

Alternatively, the refinement layers are nested one within the other in the base layer as a tree, as shown in FIG. 10: the layer $C_{13}$ uses the layer $C_{i1}$, which uses the layer $C_{i0}$, the layer $C_{i5}$ uses the layer $C_{i1}$, which uses the layer $C_{i0}$, whereas the layers $C_{i2}$ and $C_{i4}$ use the layer $C_{i0}(\ )$ In this variant, the refinement layers $C_{i3}$ and $C_{i5}$ code entirely but in high resolution the images of the stream F2 and the stream F3, respectively. This variant makes it possible for a subscriber user having a high-definition television to decode only three layers, for example $C_{i0}$, $C_{i1}$, and $C_{i3}$, and a subscriber user having a television of standard-definition to decode only two layers, for example $C_{i0}$ and $C_{i2}$, instead of, respectively, four layers ($C_{i0}$, $C_{i1}$, $C_{i2}$, and $C_{i3}$) and three layers ($C_{,i0}$, $C_{i1}$, and $C_{i2}$) if the nesting corresponding to FIG. 9 is used. It further makes it possible for a subscriber user having a standard-definition television to receive a stream conforming better to the capabilities of their television.

When coding the stream fi1, the software module CO preferably codes macroblocks corresponding to the small embedding window in the images of the streams F1, F2, and F3 independently of the other macroblocks in these images. During SVC coding with a base layer and one refinement layer, the data coded in the base layer is used to reconstruct the refinement layer. For example, in an image of the stream F1, if a macroblock of the area outside the black square is coded in a manner that relies on a macroblock situated in the area of the black square, there is a risk that it will be reconstructed badly on decoding the image of the stream F1 combined with the stream F2 or F3. During reconstruction, if the base layer $C_{i0}$ is combined with a refinement layer filling this area, such as $C_{i2}$ or $C_{i4}$, the area of the black square contains something other than black. Thus the macroblocks relying on the black area of the base layer rely on an area that is other than black and give a different reconstruction. This is true only when the refinement layer concerned is coded without knowledge of the base layer.

Consequently, the macroblocks of images outside the embedding window must not be coded using information from the macroblocks of that window. This implies a restriction at the coder level either to using groups of macroblocks called slices, which are similar to independent sub-images, or to intelligent coding prohibiting prediction on the basis of the area of the embedding window.

This use of slices is covered in the MPEG-4 AVC standard and is referred to as Arbitrary Slice Order (ASO). It is authorized only in the baseline profile commonly used as a robustness tool in the mobile context. The macroblocks corresponding to the area of the embedding window are then grouped in a first slice, for example, and those outside that area in a second slice.

For a domestic television, the Digital Video Broadcasting (DVB) consortium has adopted only the Main and High profiles. Thus it is necessary to use the second method aiming to constrain the encoder not to rely on the area of the embedding window when coding the base layer to code macroblocks outside the embedding area.

Figure 11:
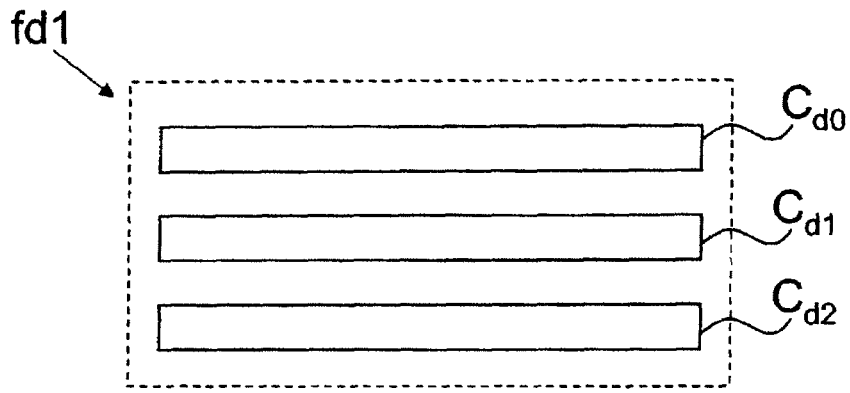
FIG. 11 represents an SVC video stream coded in accordance with an embodiment of the invention and employed in one use of the audiovisual program differentiation of an embodiment of the invention.

The software module CO also produces the stream fd1 represented in FIG. 11 corresponding to the national news followed by regional news that the content server SC has to broadcast. These contents do not require preprocessing by the preprocessing module MP. They are therefore coded directly by the coding module CO in the stream fd1, as follow:

the base layer $C_{d0}$ of the stream fd1 codes all national news images and then codes images consisting of black pixels, of number that corresponds to the regional news broadcast duration;

a refinement layer $C_{d1}$ of the stream fd1 codes images consisting of black pixels, of number that corresponds to the broadcast duration of the national news, and then codes regional news images for one region;

a refinement layer $C_{d2}$ of the stream fd1 codes images consisting of black pixels, of number that corresponds to the duration of the national news, and then codes images for the regional news broadcast of another region of the same duration as the previous one.

Figure 12:
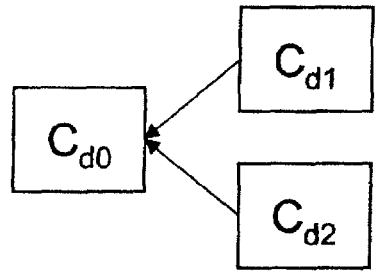
FIG. 12 represents a nesting of refinement layers within a base layer of an SVC stream.

As for the streams ft1 and fi1, each refinement layer of the stream fd1 indicates in its syntax which layer it uses for interlayer prediction. The refinement layers are thus nested one within the other in the base layer as a tree, as shown in FIG. 12: the layer $C_{d1}$ uses the layer $C_{d0}$ and the layer $C_{d2}$ uses the layer $C_{d0}$. As the blocks of layers $C_{d1}$ and $C_{d2}$ do not correspond to those of the layer $C_{d0}$, a decoder receiving the stream fd1 does not use interlayer prediction when it combines $C_{d2}$ and $C_{d0}$ or $C_{d1}$ and $C_{d0}$.

This coding of the stream fd1 makes it possible to effect regional differentiation after broadcasting the national news without using dedicated equipment at a point of presence PoP2 of the network RES3.

Alternatively, the streams ft1, fi1, and fd1 include other refinement layers, for example to improve the quality, the frequency or the spatial resolution of the coded images.

The step E3 is a step of sending streams coded in the step E2 to the entities concerned in the communications network RES. The correspondence table contained in the content server SC enables the server to determine:

that the stream ft1 is to be sent only to the point of presence PoP1, as the stream ft1 is intended only for users connected to the point of presence PoP1, in particular users connected via the display terminals TV1 and TV2;

that the stream fi1 is to be sent only to the point of presence PoP1, as the stream fi1 is intended only for users connected to the point of presence PoP1, in particular users connected via the display terminals TV3 and TV4; and that the stream fd1 is to be sent only to the point of presence PoP2, as the stream fd1 is intended only for users connected to the point of presence PoP2, in particular users connected via the display terminals TV5 and TV6.

The content server SC therefore transmits the streams ft1 and fi1 to the presence server PoP1 and the stream fd1 to the presence server PoP2. As the streams ft1, fi1, and fd1 each have at least one refinement layer for coding a visual object distinct from the visual objects coded by the base layer or another refinement layer of the stream concerned, the signals transporting the streams ft1, fi1, and fd1 are coded in accordance with an embodiment of the invention. In this step E3, the content server SC further transmits a description of the streams ft1 and fi1 to the presence server PoP1 and a description of the stream fd1 to the presence server PoP2. For the scalable streams ft1, fi1, and fd1, these descriptions advise the user profiles of users for which these streams are intended and the layers constituting these streams. For example, these descriptions are transmitted during multimedia session negotiations between the server SC and the points of presence PoP1 or PoP2 preceding transmission of the streams ft1, fi1, and fd1.

This transmission of streams requires only one session negotiation between the content server SC and the point of presence PoP1 or PoP2 for each stream. Moreover, it makes it possible to save on bandwidth. For example, to transmit the stream ft1, only one session at 3 Mb/s (megabits per second) is needed, instead of two sessions at 3 Mb/s, i.e. one session at 3 Mb/s to transmit a football match in its entirety to subscriber users and one session at 3 Mb/s to transmit a lite version of the football match to non-subscriber users.

Figure 13:
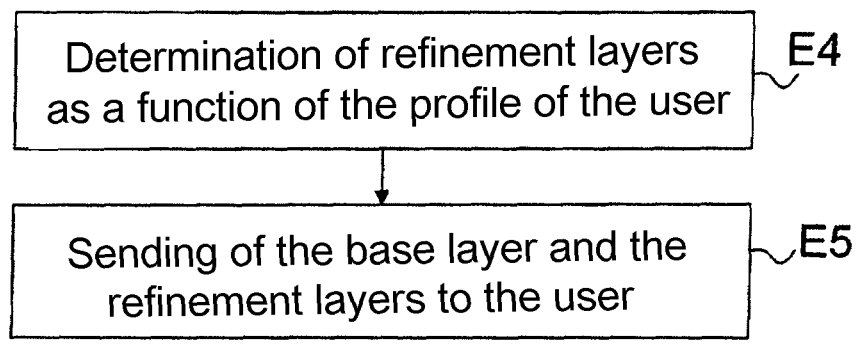
FIG. 13 represents steps of the transmission method of an embodiment of the invention.

On reception of the streams ft1, fi1, and fd1, the points of presence PoP1 and PoP2 execute the transmission method of an embodiment of the invention. This includes steps E4 and ES represented in FIG. 13:

The step E4 determines as a function of the profiles of the users connected to the point of presence PoP1 which refinement layers are more specifically intended for them. To do this the point of presence PoP1 consults the descriptions of the streams ft1 and fi1 that were transmitted to it in the step E3 by the content server SC, together with a user register stored and regularly updated in the point of presence PoP1. This user register indicates in particular the profiles of each user connected to the point of presence PoP1. At the end of this step E4, the point of presence PoP1 determines, for example:

that the user of the display terminal TV1 has a subscriber profile enabling reception of the refinement layers $C_{t1}$, $C_{t2}$, and $C_{t3}$;

that the user of the display terminal TV2 has a non-subscriber profile enabling reception only of the refinement layer $C_{t1}$;

that the user of the display terminal TV3 has a profile enabling reception only of the refinement layers $C_{i1}$, $C_{i2}$, and $C_{i3}$;

that the user of the display terminal TV4 has a profile enabling reception only of the refinement layers $C_{i1}$, $C_{i4}$, and $C_{i5}$.

As in the step E4, the point of presence PoP2 determines which refinement layers are intended for each of the users connected to the point of presence PoP2. To this end it consults the description of the stream fd1 that was transmitted to it in the step E3 by the content server SC and a user register similar that stored in the point of presence PoP1. At the end of this step E4, the point of presence PoP2 determines, for example:

that the user of the display terminal TV5 has a subscriber profile enabling reception only of the refinement layer $C_{d1}$;

that the user of the display terminal TV6 has a subscriber profile enabling reception only of the refinement layer $C_{d2}$.

In the step E5 the points of presence PoP1 and PoP2 send a base layer and refinement layers to each of the connected users for whom one of the streams ft1, fi1, or fd1, is intended.

Thus the point of presence PoP1 transmits to the user connected via the display terminal TV1 a stream ft2 including the base layer $C_{t0}$ and the refinement layers $C_{t1}$, $C_{t2}$, and $C_{t3}$ enabling the football match broadcast by the content server SC to be watched in its entirety. Alternatively, if in the step E2 the images of the players and the ball were coded by scrambling them in the refinement layers $C_{t2}$ and $C_{t3}$, the point of presence PoP1 descrambles these refinement layers before transmitting them to the user connected via the display terminal TV1 in the stream ft2.

In contrast, the user connected to the display terminal TV2 receives from the point of presence PoP1 a stream ft3 containing only the base layer $C_{t0}$ and the refinement layer $C_{t1}$. That user therefore hears the commentary on the match but sees only images of the empty pitch, as an encouragement to subscribe to the video program broadcasting the football match to view it in its entirety. Alternatively, if in the step E2 the images of the players and the ball were coded by scrambling them in the refinement layers $C_{t1}$ and $C_{t3}$, the stream ft3 transmitted to the user of the terminal TV2 by the point of present PoP1 includes the base layer $C_{t0}$ and the refinement layers $C_{t1}$, $C_{t2}$, and $C_{t3}$. This user therefore sees scrambled images of the players and the ball, as an encouragement to subscribe to the video program broadcasting the football match to eliminate this visual impediment caused by the scrambling.

The terminals TV1 and TV2 decode the streams ft2 and ft3 naturally using an SVC decoder by means of the indication in each refinement layer of the lower layer on which it relies for interlayer prediction, even if the decoder does not systematically use the prediction. Implementing an embodiment of the invention using SVC streams therefore does not require dedicated SVC decoders.

In the step E5, the point of presence PoP1 also transmits to the user connected via the display terminal TV3 a stream fi2 including the base layer $C_{i0}$ and the refinement layers $C_{i1}$, $C_{i2}$, and $C_{i3}$, enabling the news magazine broadcast by the content server SC to be viewed with no embedding window.

In contrast, it transmits to the user connected via the display terminal TV4 a stream fi3 including the base layer $C_{i0}$ and the refinement layers $C_{i1}$, $C_{i4}$, and $C_{i5}$, enabling the news broadcast by the content server SC to be viewed with an interpretation in sign language in an embedded window.

The video decoder in the display terminal TV4 implements the method of embedding images of a first video stream in images of a second video stream. This embedding is effected naturally by recombining the layers $C_{i0}$, $C_{i1}$, $C_{i4}$, and $C_{i5}$.

In a different implementation, the point of presence PoP1 transmits the stream ft1 to the home gateways PD1 and PD2 and transmits the stream fi1 to the home gateways PD3 and PD4, the refinement layers to send to the terminals TV1, TV2, TV3, and TV4 being selected as a function of the user profiles in the respective gateways PD1, PD2, PD3, and PD4. These are remotely configured by the service provider managing the content server SC, for example, if it is also the access operator of the users of the terminals TV1, TV2, TV3, and TV4, for example.

Moreover, in the step ES, the point of presence PoP2 implements the method of differentiating an audiovisual program by sending the user of the display terminal TV5 a stream fd2 including the base layer $C_{d0}$ and the refinement layer $C_{d1}$ and the user of the display terminal TV6 a stream fd3 including the base layer $C_{d0}$ and the refinement layer $C_{d2}$. Thus when the content server broadcasts the national news, the stream fd1 codes the news in the base layer CdO that is transmitted to the point of presence PoP2 and then thereby to the users of the terminals TV5 and TV6. At the end of broadcasting the national news, the content server broadcasts different regional news in the refinement layers $C_{d1}$ and $C_{d2}$ of the stream fd1 that are transmitted to the point of presence PoP2, which in turn transmits the refinement layer $C_{d1}$ to the user of the terminal TV5 and the refinement layer $C_{d2}$ to the user of the terminal TV6. Thus these two users are able to view two different regional news broadcasts without a splicer specific to the point of presence PoP2 being used. The splicing of the national news broadcast and each of the regional news broadcasts is not effected by the point of presence PoP2 but is effected naturally by the decoders of the terminals TV5 and TV6 by combining the layers $C_{d0}$ and $C_{d1}$ and by combining the layers $C_{d0}$ and $C_{d2}$, respectively.

An embodiment of the present disclosure remedies the drawbacks of the prior art technique by providing a method and a device for coding a scalable video stream adaptable as a function of the user profile and transmission methods and a transmission system that make it possible to save on network resources at the same time as being simple to use.

Although the present disclosure has been described with reference to one or more examples, workers skilled in the art will recognize that changes may be made in form and detail without departing from the scope of the disclosure and/or the appended claims.

The invention claimed is:

1. A method comprising:
coding a video sequence in a video stream using a device, wherein the video sequence comprises content requiring a subscription and the video stream includes a base layer and one or more refinement layers associated with different user profiles, wherein for at least one image of the video sequence, coding comprises:
coding in said base layer at least one portion of said image, which is common to all said different user profiles, wherein at least another portion of said image corresponding to an area of interest has been extracted from the base layer; and
coding in at least one of said refinement layers said at least another portion of said image corresponding to said area of interest, said another portion being distinct from said at least one portion coded in said base layer or in another of said refinement layers; and
generating a description of the video stream for transmission to a receiver of the video stream, which associates the at least one refinement layer with a given user profile for which the at least one refinement layer is intended,
wherein users with the subscription are able to view said another portion of said image corresponding to the area of interest by processing and displaying the refinement layer, and
wherein users without the subscription are able to process and display only the base layer, and are unable to process and display the refinement layer to view said another portion of said image.

2. A method of transmitting a video stream to users, each user having one of a plurality of different user profiles, said users being connected via display terminals to a communications network, said method of transmitting comprising:
coding a video sequence in the video stream using a device, wherein the video sequence comprises content requiring a subscription and the video stream includes a base layer and one or more refinement layers associated with different user profiles, wherein for at least one image of the video sequence, coding comprises:
coding in said base layer at least one portion of said image, which is common to all said different user profiles, wherein at least another portion of said image corresponding to an area of interest has been extracted from the base layer; and
coding in at least one of said refinement layers said at least another portion of said image corresponding to said area of interest, said another portion being distinct from said at least one portion coded in said base layer;
generating a description of the video stream for transmission to a receiver of the video stream, which associates the at least one refinement layer with a given user profile for which the at least one refinement layer is intended; and
sending said description, said base layer and said refinement layer from the device via said communications network for a plurality of the users, wherein at least two of the plurality of users have different ones of the user profiles, said at least one refinement layer being configured to be combined with said base layer for the users having the given user profile associated with that refinement layer, wherein users with the subscription are able to view said another portion of said image corresponding to the area of interest by processing and displaying the refinement layer, and wherein users without the subscription are able to process and display only the base layer, and are unable to process and display the refinement layer to view said another portion of said image.

3. The method according to claim 1, wherein the method further comprises:

embedding images of a first video stream in images of a second video stream, wherein:

said base layer includes images coded in the base layer, which are obtained by processing said images of the second video stream, said processing including a step of extracting image portions situated in embedding areas intended to receive said images of the first video stream; and said at least one refinement layer includes said images of the first video stream coded in said at least one refinement layer.

4. The method of transmitting according to claim 2, wherein the method further comprises:

differentiating an audiovisual program, which broadcasts successively a generic sequence of images and then personalized sequences of images according to the steps of coding, generating and sending, wherein:

when said generic sequence is broadcast, said base layer includes said generic sequence coded in the base layer; and when said personalized sequences are broadcast, said at least one refinement layer includes only one of said personalized sequences coded in the at least one refinement layer, said base layer no longer comprising coded visual objects, and said personalized sequence being associated with the given user profile.

5. A device for coding a video sequence in a video stream, wherein the video sequence comprises content requiring a subscription and the video stream includes a base layer and one or more refinement layers associated with different user profiles, the device comprising for at least one image of the video sequence:

means for coding in said base layer at least one portion of said image, which is common to all said different user profiles, wherein at least another portion of said image corresponding to an area of interest has been extracted from the base layer;

means for coding in at least one of said refinement layers said at least another portion of said image corresponding to said area of interest, said another portion being distinct from said at least one portion coded in said base layer or in another of said refinement layers; and means for generating a description of the video stream for transmission to a receiver of the video stream, which associates the at least one refinement layer with a given user profile for which the at least one refinement layer is intended, wherein users with the subscription are able to view said another portion of said image corresponding to the area of interest by processing and displaying the refinement layer, and wherein users without the subscription are able to process and display only the base layer, and are unable to process and display the refinement layer to view said another portion of said image.

6. A system for transmitting a video stream to users, each user having one of a plurality of different user profiles and being connected via display terminals to a communications network, said system comprising:

means for coding a video sequence in the video stream, wherein the video sequence comprises content requiring a subscription and the video stream includes a base layer and one or more refinement layers associated with different user profiles, wherein for at least one image of the video sequence, coding comprises:

coding in said base layer at least one portion of said image, which is common to all said different user profiles, wherein at least another portion of said image corresponding to an area of interest has been extracted from the base layer; and coding in at least one of said refinement layers said at least another portion of said image corresponding to said area of interest, said another portion being distinct from said at least one portion coded in said base layer or in another of said refinement layers;

means for generating a description of the video stream for transmission to a receiver of the video stream, which associates the at least one refinement layer with a given user profile for which the at least one refinement layer is intended; and means for transmitting said description, said base layer and said refinement layer via said communications network for a plurality of the users, wherein at least two of the plurality of users have different ones of the user profiles, and wherein said at least one refinement layer is configured to be combined with said base layer for the users having the given user profile associated with that refinement layer, wherein users with the subscription are able to view said another portion of said image corresponding to the area of interest by processing and displaying the refinement layer, and wherein users without the subscription are able to process and display only the base layer, and are unable to process and display the refinement layer to view said another portion of said image.

7. A non-transitory computer readable medium comprising a computer program stored thereon and including instructions for implementing a method when the instructions are executed on a computer, wherein the method comprises:

coding a video sequence in a video stream using a device, wherein the video sequence comprises content requiring a subscription and the video stream includes a base layer and one or more refinement layers associated with different user profiles, wherein for at least one image of the video sequence, coding comprises:

coding in said base layer at least one portion of said image which is common to all said different user profiles, wherein at least another portion of said image corresponding to an area of interest has been extracted from the base layer; and coding in at least one of said refinement layers said at least another portion of said image corresponding to said area of interest, said another portion being distinct from said at least one portion coded in said base layer or in another of said refinement layers; and generating a description of the video stream for transmission to a receiver of the video stream, which associates the at least one refinement layer with a given user profile for which the at least one refinement layer is intended, wherein users with the subscription are able to view said another portion of said image corresponding to the area of interest by processing and displaying the refinement layer, and wherein users without the subscription are able to process and display only the base layer, and are unable to process and display the refinement layer to view said another portion of said image.

* * * * *